W. W. ANNABLE.
TRANSMISSION GEARING FOR AUTOMOBILES.
APPLICATION FILED AUG. 23, 1915.

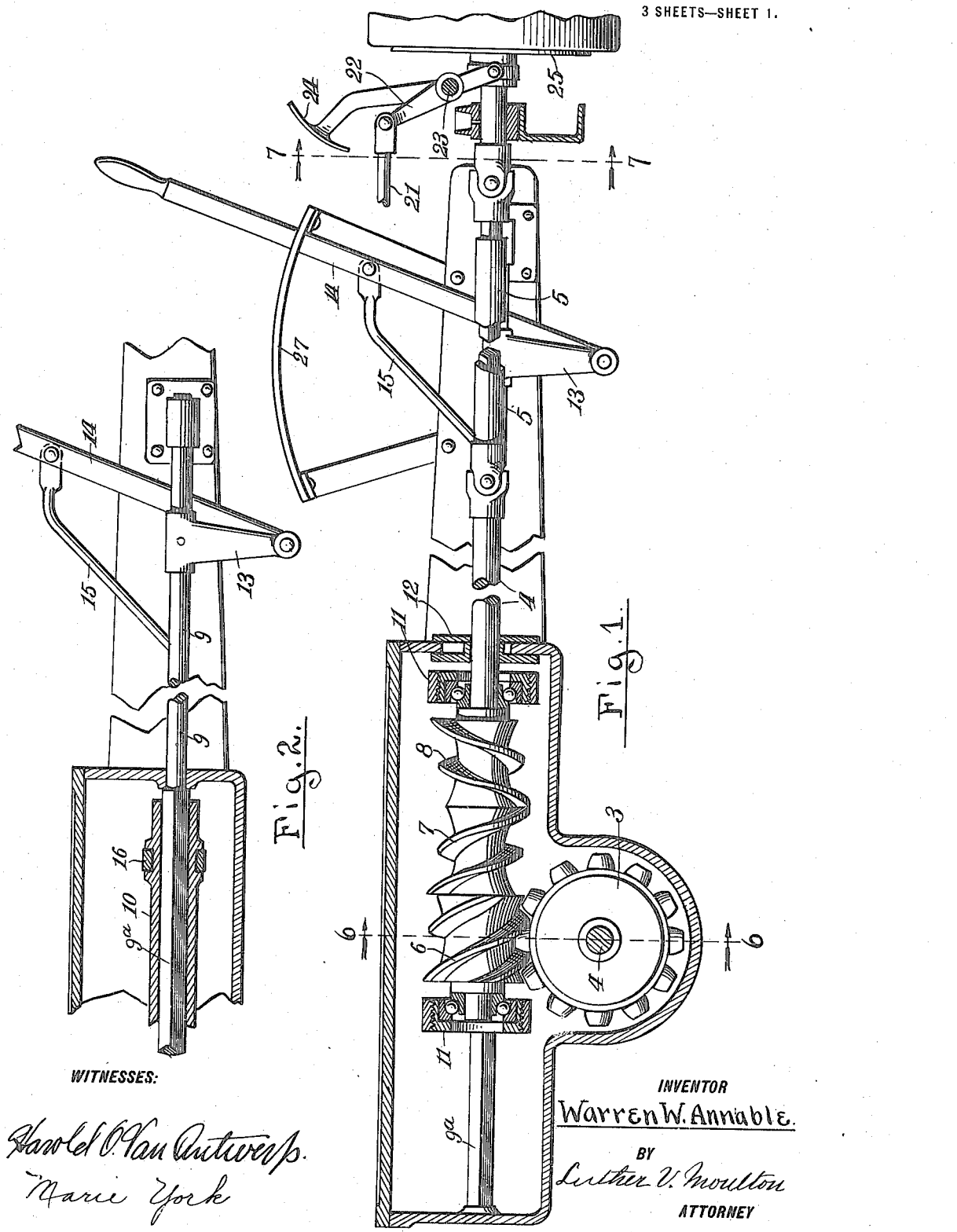

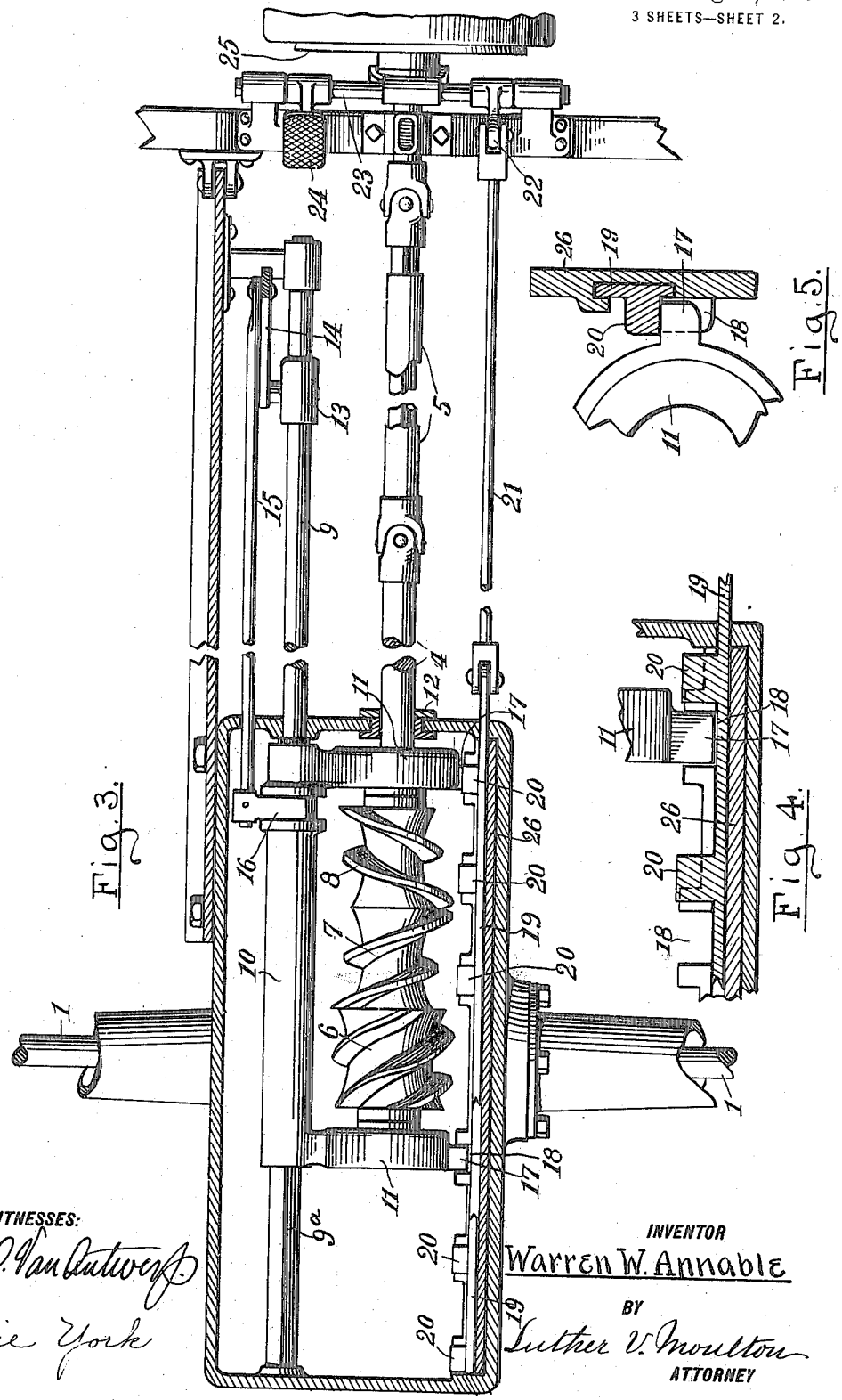

1,194,326.

Patented Aug. 8, 1916.
3 SHEETS—SHEET 3.

WITNESSES:
Harold O. Van Antwerp
Marie York.

INVENTOR
Warren W. Annable
BY
Luther V. Moulton
ATTORNEY

UNITED STATES PATENT OFFICE.

WARREN W. ANNABLE, OF GRAND RAPIDS, MICHIGAN.

TRANSMISSION-GEARING FOR AUTOMOBILES.

1,194,326.  Specification of Letters Patent.  Patented Aug. 8, 1916.

Application filed August 23, 1915. Serial No. 47,002.

*To all whom it may concern:*

Be it known that I, WARREN W. ANNABLE, a citizen of the United States of America, residing at Grand Rapids, in the county of Kent and State of Michigan, have invented certain new and useful Improvements in Transmission-Gearing for Automobiles; and I do hereby declare the following to be a full, clear, and exact description of the invention, such as will enable others skilled in the art to which it appertains to make and use the same.

My invention relates to improvements in transmission gearing for automobiles, and its object is to provide worm gearing having different speeds and a reverse; to provide improved means for operating the same, and to provide the device with various new and useful features as hereinafter more fully described and particularly pointed out in the claims.

My invention consists essentially of a worm gear having improved teeth to reduce friction, a series of worms to engage the same and slidably mounted on the driving shaft, and means for shifting the several worms into engagement with the gear and for throwing the same entirely out of such engagement, said means consisting of a driving shaft having a telescopic portion, said worms being mounted thereon, a rock shaft having a yoke slidable thereon in which the driving shaft is journaled and by which the driving shaft is laterally movable toward and away from the gear, a lever connected to the rock shaft whereby the same is operated, a rod connecting the lever and the yoke to slide the yoke on the rock shaft to engage and disengage the worms with the gear, and locking means for holding the respective worms in engagement with the gear, automatically operated by the mechanism for operating the clutch which engages and disengages the motor from the driving shaft, and in various features of combination and arrangement, as will more fully appear by reference to the accompanying drawings, in which:—

Figure 6:
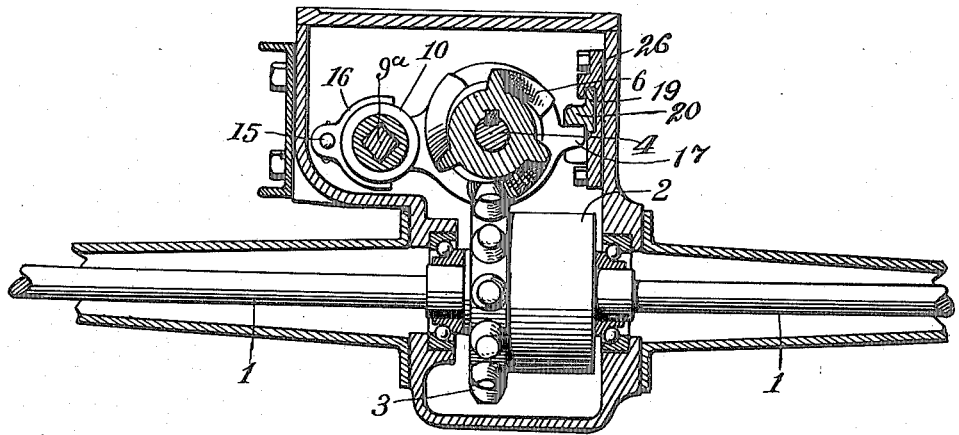
Figure 7:
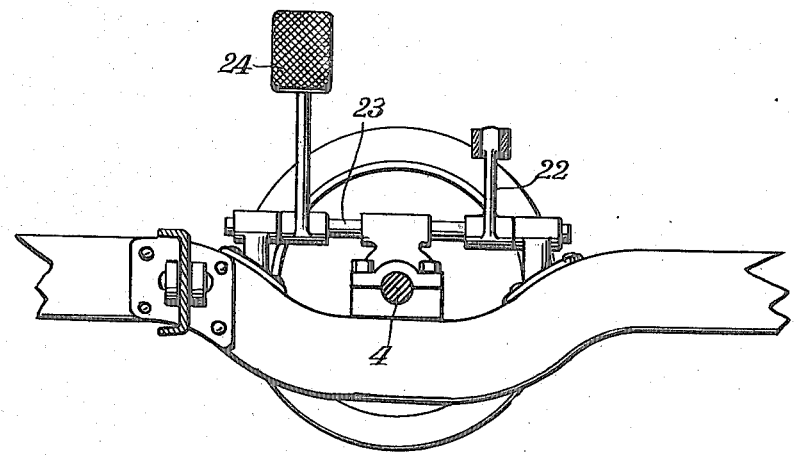
Figure 8:
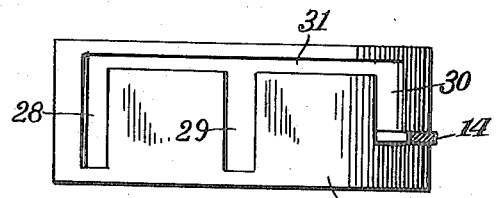

Figure 1 is an elevation of a device embodying my invention, with portions broken away showing the driving shaft and gearing and portions of the operating mechanism; Fig. 2 a detail in elevation showing the rock shaft and portions connected therewith; Fig. 3 a plan view of the device with portions removed; Fig. 4 an enlarged detail of a portion of the means for locking the worms in engagement with the gear; Fig. 5 a transverse section of the parts shown in Fig. 4; Fig. 6 a transverse vertical section in the plane of the rear axle; Fig. 7 a detail of the clutch lever and parts attached shown in transverse position; and Fig. 8 a detail of the holding segment for the lever 14.

Like numbers refer to like parts in all of the figures.

1 represents the rear axle of an automobile; 2 the differential of any convenient form; 3 a worm gear having radial anti-friction teeth in its periphery; 4 the driving shaft operated by an engine connected thereto by the clutch 25. This shaft is provided with a telescopic portion 5, whereby the rear part of the shaft can be moved longitudinally as occasion requires to severally engage worms 6, 7, and 8, fixed on the rear end of the shaft 4. The worm 6 is of greater diameter and more rapid pitch than the others to provide for high speed, the worm 7 is preferably of lesser diameter and pitch to provide for low speed and the worm 8 of reverse pitch to provide for reversing the movement of the car.

9 is a rock shaft arranged parallel with the driving shaft 4 and spaced apart therefrom a suitable distance. Mounted on this shaft 9 and slidable thereon is a sleeve 10 having arms 11 at its respective ends, thus forming a yoke carrying the driving shaft 4 journaled in the said arms. The rock shaft at 9ª is preferably angular in cross section and the sleeve 10 internally angular to fit the same, whereby the sleeve slides freely on the shaft and rocks therewith. To oscillate this shaft an arm 13 is fixed thereon at one end, to the other end of which is pivoted a lever 14.

Movement of the lever in the plane of its pivot will oscillate the shaft 9 about its axis and thus throw the respective worms into and out of engagement with the gear 3. To shift the worms longitudinally a rod 15 is pivoted midway of the lever 14 at one end and extending to the sleeve 10 is connected therewith by a fork 16, whereby moving the lever about its pivot slides the sleeve, together with the worms longitudinally to the various positions for engaging any respective worm with the gear 3. To hold a worm securely in engagement with the gear, the arms 11 are provided with lugs 17 adapted to engage respectively with recesses 18 in a fixed bar 26. (See Fig. 5). Slidable in this bar is a locking bar 19 having suitable projections 20 thereon adapted when the bar 19 is in locking position to be opposite the recesses 18 and engage the lugs 17 to hold the same in the recesses. To automatically shift this bar 19 and release the lugs when the clutch 25 is released and disconnects the engine with the driving shaft, a rod 21 is connected to the bar 19 at one end and extending forward is connected at the other end to an arm 22 fixed on a rock shaft 23 provided with a pedal 24 to release the clutch 25, which is automatically engaged by a spring (not shown) in the usual manner. It will be noted that it is thus impossible to release the worms from engagement with the gear when the engine is connected to the driving shaft and if the worm is disconnected and the engine connected to the driving shaft it is impossible to engage the worm with the gear, thus accidents are practically impossible by inadvertent wrong manipulation of the device.

To hold the lever 14 and to control its proper movement a segment 27 is provided having a slot 31 therein adapted to be traversed by the lever when the same is thrown to the left to disengage the worm from the gear. It will be noted that this cannot be done, however, except when the clutch is disengaged and the locking bar moved out of locking position thereby. At each end of this slot 31 and near the middle of the same in positions to properly bring the respective worms opposite the gear 3, are lateral slots 28 for the worm 8, 29 for the worm 7, and 30 for the worm 6, and the depth of these slots is such that when the lever 14 is in the bottom of the same the respective worms will be properly engaged with the gear and the lugs adjusted in the recesses 18. The clutch can then be thrown in and this movement will automatically slide the bar 19 and bring the projections 20 in locking position over the lugs 17, thus locking the lever in a slot, and when the lever is in the slot 31 the worms cannot be engaged with the gear, thus insuring proper engagement of the same.

From the foregoing description the operation is obvious without further explanation.

What I claim is:—

1. Transmission gearing comprising a worm gear, a yoke member adapted to oscillate about its axis, and also longitudinally movable, arms projecting laterally from said members, a shaft carried by the arms, a series of worms carried by the shaft and adapted to severally engage the said gear, means for adjusting the yoke about its axis and means for adjusting the yoke longitudinally to separately engage the respective worms with the said gear.

2. Transmission gearing comprising a worm gear, a series of worms to separately engage and drive the same, means for shifting the worms to engage and disengage a respective worm with the gear, a clutch to connect the worms with means for driving the same, and means for locking the respective worms in engagement with the gear whenever the clutch is operative.

3. The transmission gearing comprising a worm gear, a worm, a laterally movable bearing in which the worm is journaled, means for laterally shifting the bearing to engage and disengage the worm with the gear, a lug on the bearing, a fixed member having a recess to receive the lug when the worm is engaged with the gear, a clutch to engage the worm with driving means, means for locking the lug within the recess and means for operating the clutch, also connected to the locking means and arranged to lock the lug when the clutch is operative and to release the lug when the clutch is inoperative.

4. Transmission gearing comprising a worm gear, a laterally movable worm to engage the gear, means for laterally adjusting the worm to engage and disengage it with the gear, a lug connected to the worm to hold the same engaged or out of engagement with the worm, a fixed member having a recess to receive the lug, a slide to close the recess and prevent ingress or egress of the lug, a clutch to connect the worm to driving mechanism, means for operating the clutch and the locking mechanism, whereby the same are simultaneously operative and inoperative.

5. Transmission gearing comprising a worm gear, a worm adjustable to engage and disengage the gear, a clutch to connect and disconnect the worm with driving means, means for engaging and disengaging the clutch, and automatic means for locking of the worm in engagement with the gear when the clutch is adjusted to connect the worm with the driving mechanism.

6. Transmission gearing comprising a worm gear, a series of worms laterally adjustable to engage and disengage with the gear, and longitudinally adjustable to severally engage the worms with the gear, means for adjusting the worms, a clutch to connect the worms with driving means, means for locking the worms when adjusted, means for simultaneously adjusting the clutch and locking means to operative or inoperative positions whereby when the clutch is operative the worms are locked in position and when the clutch is inoperative the worms are unlocked and free to be adjusted.

7. Transmission gearing comprising a worm gear, a series of worms journaled in laterally and longitudinally adjustable bearings, means for adjusting the same, lugs on the bearings, a fixed bar having recesses to receive the lugs when a worm is engaged with the gear, a slidable bar having means for closing the recesses, a clutch to connect the worms with driving means, and means connected to both the clutch and locking bar to simultaneously shift the same to operative or inoperative position.

8. Transmission gearing, comprising a worm gear, a series of worms adapted to separately engage the gear, a rock shaft parallel with the axis of the worms, a sleeve slidable on the shaft, arms on the sleeve carrying the worms, an arm fixed at one end to the rock shaft, a lever pivoted to the other end of the arm, a rod connecting the sleeve and lever to slide the sleeve on the shaft, and means for holding the lever in various adjusted positions.

9. Transmission gearing, comprising a worm gear, a series of worms adapted to separately engage the gear, a rock shaft parallel with the axis of the worms, a yoke slidable on the shaft and having arms carrying the worms, an arm fixed at one end to the shaft, a lever pivoted to the other end of the arm, a rod connecting the lever and the sleeve to slide the sleeve on the shaft, a segment having a slot traversed by the lever when the same is turned to disengage the worms from the gear and also having lateral slots to receive the lever when a respective worm is opposite the gear.

10. Transmission gearing, comprising a worm gear, a series of worms having different screw threads, a yoke carrying the worms, lugs on the yoke, a fixed bar having recesses to receive the lugs when one of the worms is engaged with the gear and a sliding locking bar having projections adapted to hold the lugs in the recesses.

11. In transmission gearing, a worm gear, a series of worms to respectively engage the gear, a yoke carrying the worms, a rock shaft to oscillate the yoke and on which the yoke is slidable, means for adjusting the yoke and shaft, lugs on the yoke, a fixed bar having recesses to receive the lugs, a sliding bar having projections to hold the lugs in the recesses, a rock shaft adapted to release a clutch, an arm on the rock shaft and a rod connecting the arm and the sliding bar whereby when the clutch is engaged the lugs are held in the recesses by the projections and when the clutch is disengaged the lugs are free to move out of the recesses.

12. In transmission gearing, a worm gear, a series of worms, arms carrying the worms, means for swinging the arms to disengage the worms, means for shifting the arms to move the worms longitudinally, lugs on the arms, a fixed bar having recesses to receive the lugs, a bar slidable in the fixed bar and having projections to hold the lugs in the recesses, a rock shaft to disengage a clutch, an arm on the rock shaft, a rod connecting the arm to the locking bar to move the same when the clutch is moved.

13. Transmission gearing, comprising a worm gear, a series of worms to respectively engage the gear, a shaft on which the worms are mounted, means for driving the shaft engaged therewith by a clutch, a rock-shaft parallel to the driving shaft, a yoke slidable on the rock-shaft having arms carrying the driving shaft and worms, an arm fixed at one end to the rock-shaft, a lever pivoted to the other end of the arm and movable in the plane of the axis of its pivot to oscillate the rock shaft, a rod connecting the lever and the yoke to slide the same on the rock shaft, a segment having a slot traversable by the lever when the worms are out of engagement with the gear, also having lateral slots to receive the lever when a worm is opposite the gear, and permit engagement of the same, means for automatically locking the worms in engagement with the gear when the clutch is in operative position.

In testimony whereof I affix my signature.

WARREN W. ANNABLE.